Aug. 29, 1961     A. F. HICKMAN     2,998,266
CONSTANT HEIGHT SPRING SUSPENSION FOR VEHICLES
Filed Aug. 27, 1959     2 Sheets-Sheet 2
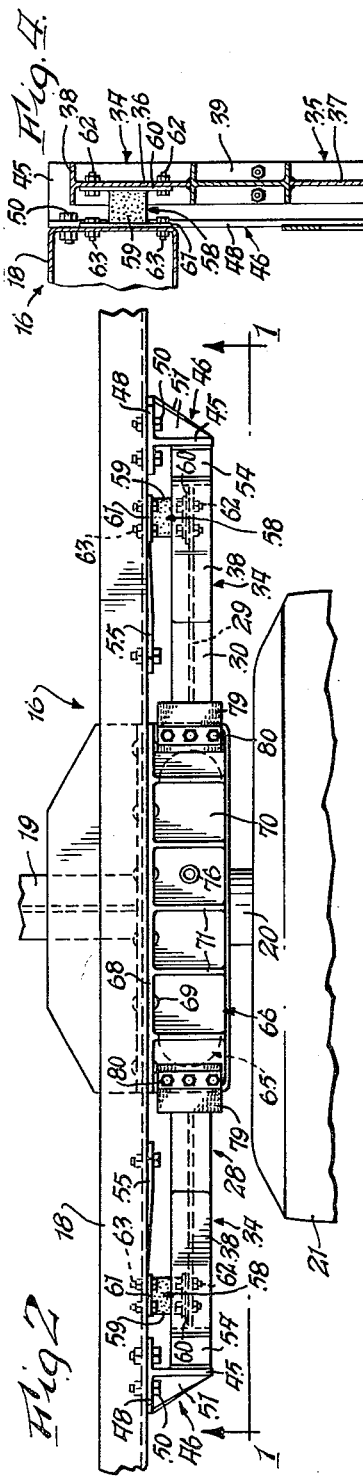
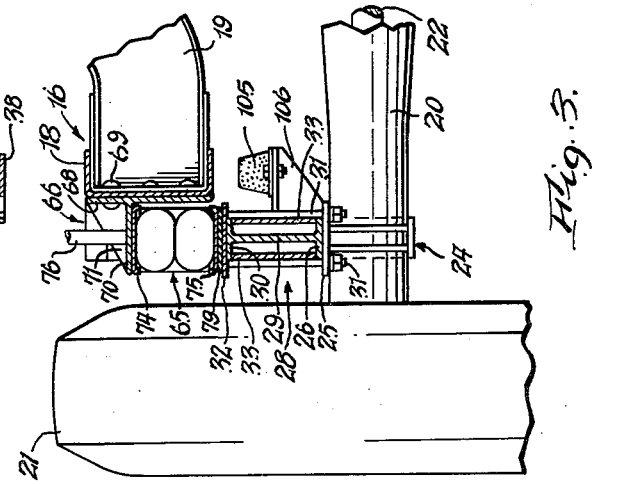
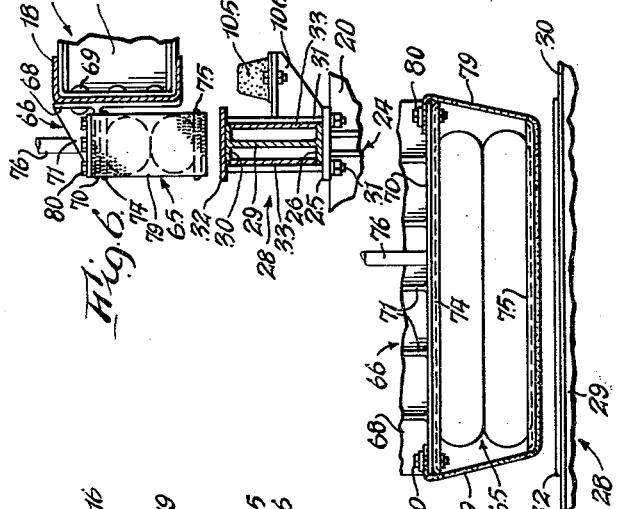
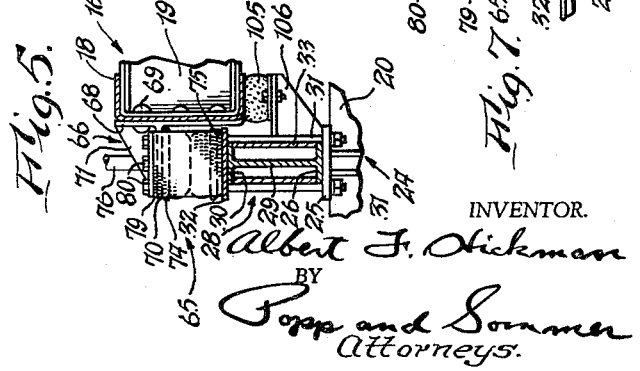
INVENTOR.
Albert F. Hickman
BY
Popp and Sommer
Attorneys.

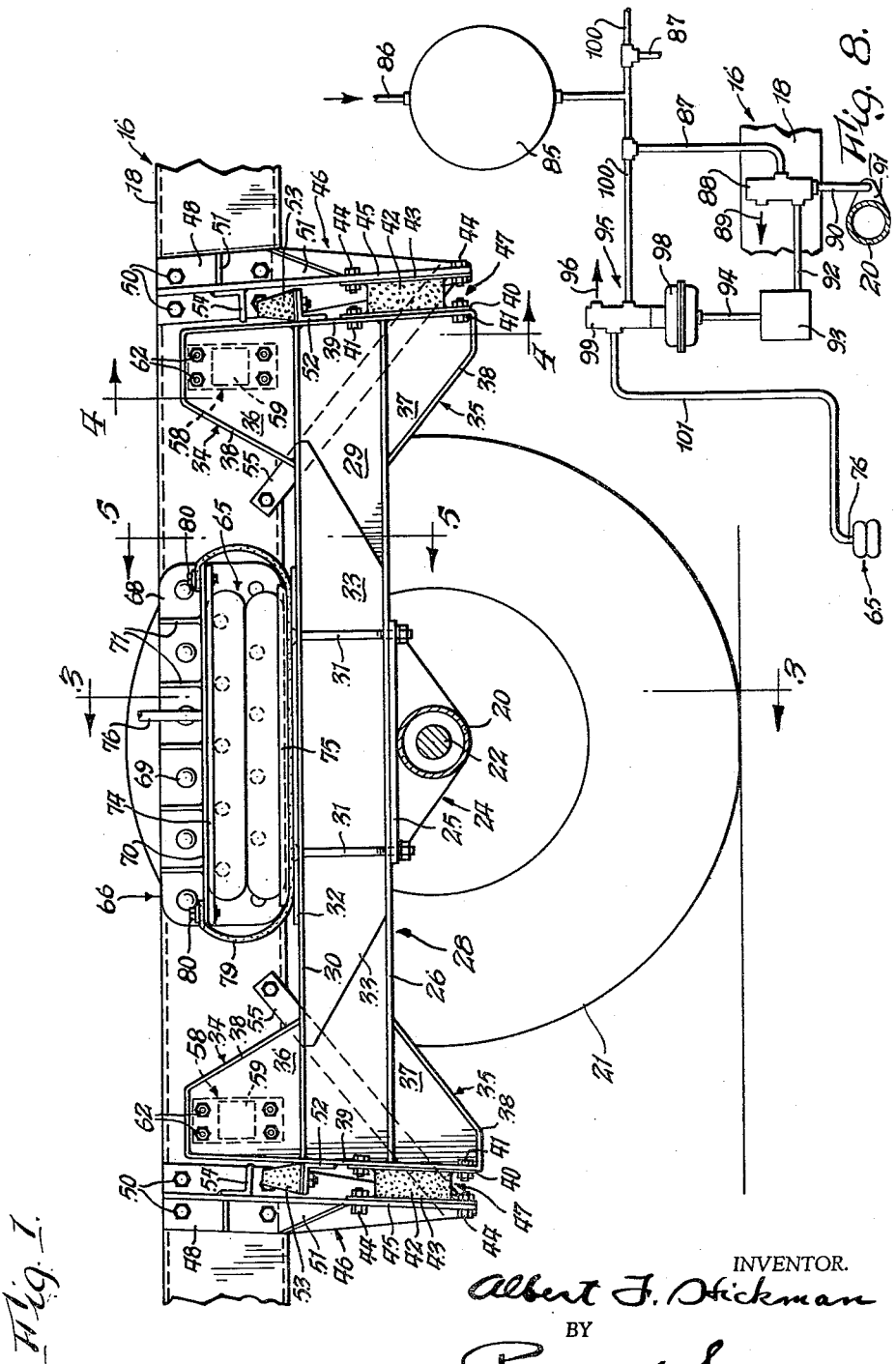

2,998,266
CONSTANT HEIGHT SPRING SUSPENSION FOR VEHICLES

Albert F. Hickman, Eden, N.Y., assignor to Hickman Developments, Inc., Eden, N.Y., a corporation of New York
Filed Aug. 27, 1959, Ser. No. 836,402
7 Claims. (Cl. 280—124)

This invention relates to a vehicle spring suspension in which an important part of the resilient support is provided by rubber bodies acting in shear, a principal feature of the invention being, however, the provision of means for maintaining the body at a substantially constant height, regardless of load, this being shown as attained through the use, in the suspension, of inflated air springs or bellows the pressure in which is varied in response to changes in load on or height of the body from the ground to maintain the body at the desired constant elevation. The present application is an improvement on the form of Vehicle Spring Suspension shown in my co-pending application, Serial No. 833,514, filed August 13, 1959.

In common with the spring suspension as shown in this copending application, important objects of the present invention are to provide (1) a spring suspension, including rubber bodies acting in rectilinear shear which will permit the large amount of vertical movement necessary with highway vehicles to provide a vertical ride as soft as load heights will allow and at a low frequency both when empty and under full load, (2) which is free from friction, (3) in which lateral, vertical, angular and a slight amount of longitudinal or axial axle movements, with reference to the vehicle frame, are permitted and resiliently resisted, (4) in which the need for lubrication is greatly reduced, (5) which is very light in weight, particularly in unsprung weight, as compared with conventional suspensions, (6) which will not interfere with vertical, lateral and vertical angular axle movement with respect to the frame, (7) which provides a much wider and higher base or support for the body than that provided by conventional leaf springs, with consequent increased stability, (8) which can be easily taken down and replaced, (9) which renders radius rods or auxiliary devices for the control of sidesway, such as torsion bar stabilizers, unnecessary and at the same time adequately resists all brake and drive torque reactions, (10) in which periodic vibration of the suspension is dampened out and in which wheel tramp is avoided, (11) which employs rubber blocks or bodies in rectilinear shear in which the bond stress of the rubber is kept within safe working limits, (12) in which a simple and effective means is provided for limiting the lateral movement of the vehicle frame with reference to the axle to provide adequate sidesway control, (13) in which sidesway control cushions are arranged outside the frame so as to be widely spaced, and are arranged a substantial distance above the axle so as to be at a high elevation, such high and wide spacing of these control devices giving maximum control of body sidesway with minimum resistive force, (14) in which such sidesway control devices do not produce any undesirable eccentric or unbalanced forces, and (15) in which such sidesway control devices remain at substantially a constant height from the ground so as to be correspondingly increasingly effective as the load carried by the vehicle increases and forces the body down.

A specific object of the present invention is to provide such a suspension in which the body, particularly at the rear axle, can be maintained at a substantially constant height with reference to the axle and ground, that is, within a range of one-half inch or less.

Another object is to provide such a suspension in which such constant height is maintained by air springs or bellows in the suspension in series with the shear rubber springs and in which the pressure is varied to maintain the body at a constant height regardless of load.

Another object of the invention is to provide such a suspension in which the air springs act essentially to provide only vertical cushioning and positioning of the elevation of the vehicle frame, lateral axle movement as well as fore-and-aft axle movement with reference to the frame being essentially resisted by rubber springs which act in compression for this specific service.

Another object is to provide a simple and effective way of positively limiting the rebound forces of the air springs and in particular to prevent such rebound forces from acting deleteriously upon the relatively light shear rubber springs which are in service, for vertical action essentially only when the vehicle is traveling empty.

Another specific object is to provide simple and effective means for preventing overstressing of either the air springs or the shear rubber springs.

Another object is to provide such a suspension which includes air springs or bellows, which are constant rate springs, for service when the truck is loaded and to maintain a constant body height, but which are cut out of service when the truck is traveling along unloaded, the vertical support for the empty body being provided by shear rubber bodies.

Another object is to provide such a suspension in which very small shear rubber springs are required, these springs acting in shear essentially to provide resilient support for the empty body and acting in compression to control sidesway and lateral and longitudinal movement of the body with reference to the axle.

Other objects and advantages of the invention will be apparent from the following description and drawings in which:

FIG. 1 is a fragmentary, vertical section taken generally on line 1—1, FIG. 2 and showing the suspension and frame in elevation, the parts being shown in empty body condition in which the resilient support is provided by rubber bodies acting in rectilinear shear, the air springs or bellows being shown as just touching the axle structure and not being in active service.

FIG. 2 is a top plan view of one side of the vehicle frame supported on a rear drive axle by spring suspension embodying the present invention.

FIG. 3 is a vertical transverse section taken generally on line 3—3, FIG. 1.

FIG. 4 is a vertical transverse section taken generally on line 4—4, FIG. 1.

FIG. 5 is a fragmentary vertical section taken generally on line 5—5, FIG. 1 and showing the position of the parts under maximum shock load condition.

FIG. 6 is a view similar to FIG. 5 and showing the position of the parts under rebound conditions and in particular illustrating how the rebound force of the air springs is positively limited and prevented from acting against the smaller shear rubber springs.

FIG. 7 is a fragmentary view similar to FIG. 1 with the parts shown, however, under extreme rebound conditions and illustrating the manner in which the rebound force of each air spring is positively limited or contained.

FIG. 8 is a diagrammatic representation of a pneumatic circuit whereby the air pressure within the air springs is increased in response to an increase in the load upon the truck so as to maintain the body at a constant height at all times.

In the form of the invention illustrated, the main frame 16 of the vehicle can be of any suitable construction and is shown as comprising a pair of main longitudinal side frame bars in the form of inwardly facing channels 18, which are shown as straight and parallel and connected by the usual cross frame bars 19. The entire vehicle chassis, together with the vehicle suspension, is constructed substantially symmetrically about a vertical longitudinal medial plane and hence it is deemed sufficient to confine the following detailed description to one rear side of vehicle, it being understood that this description and the same reference numerals apply to the opposite rear side of the vehicle.

The present invention is directed particularly to the suspension at the rear of a highway truck and which is in turn supported on a rear or drive axle housing 20 in turn supported by rubber tired rear driving wheels 21 at its opposite ends, the wheels being fast to the usual pair of rear drive axles 22 connected by the usual differential (not shown) contained within the drive axle housing 20. The term "wheels" as used herein includes the rubber tires thereof and the term "axles" as used herein includes the housings thereof.

On each end of the drive axle housing 20, externally of the main longitudinal side frame bar 18, is mounted an axle bracket 24 which can be secured to the axle housing in any suitable manner and which includes a rectangular, horizontally disposed top plate 25 which is elongated lengthwise of the direction of movement of the vehicle or parallel with the adjacent main longitudinal side frame bar 18.

This top plate 25 rigidly supports the bottom flange 26 of a rigid horizontal I-beam or truss indicated generally at 28 and shown as having additionally a vertical central web 29 and a top flange 30. This I-beam or truss 28 is preferably removably secured to the top plate 25 of the axle bracket 24 by vertical corner bolts 31 each extending through a corresponding corner of the top plate 25 and through a corresponding corner of a top plate 32 on the top flange 30 of the I-beam or truss 28. The I-beam or truss 28 is shown as reinforced at its center by a pair of vertical side webs 33 connecting the outer edges of the flanges 26, 30 of the I-beam at the center thereof so as to form a truss which is of box form in cross section at the center of the I-beam.

To each end of the I-beam or truss 28 is welded an upright bracket 34 which projects upwardly therefrom and a depending bracket 35 which projects downwardly therefrom, these brackets preferably having vertical central webs 36 and 37, respectively, and being suitably reinforced by marginal flanges 38 which provide vertical end plates 39 at opposite ends of the truss. It will be noted that these end plates 39 at opposite ends of each truss 28 are in planes extending transversely of the vehicle and incline upwardly toward each other, the purpose of this slope or incline being to provide a wedging action on rubber bodies acting in shear as hereinafter described.

A vertically elongated rectangular metal plate 40 is secured to the external face of the upright end plate 39 at each end of the truss or I-beam 28 by corner bolts 41, these plates 40 thereby converging upwardly with reference to each other. To the face of each rectangular metal plate 40 opposite from the corresponding end plate 39 is vulcanized a rubber body 42. The opposite face of each of these rubber bodies is vulcanized to a vertically elongated rectangular metal plate 43 which is connected by corner bolts 44 to the upright flange 45 of a frame bracket 46. The rubber bodies 42 and their attaching plates 40, 43 provide a shear rubber spring 47 at each end of each truss or I-beam 28. This flange projects outwardly from the frame toward the plane of the corresponding wheel 21 from an attaching portion 48 which is shown as secured to the vertical external face of the corresponding main longitudinal side frame bar 18 by bolts 50. The upright flange 45 is shown as reinforced by lateral triangular reinforcing webs 51 between it and the attaching portion 48. The flanges 45 of the frame brackets 46 at opposite ends of the truss 28 converge upwardly parallel with the adjacent end plates 39 and the plates 40, 43 for the rubber bodies 42.

Each pair of rubber bodies 42 provides the resilient resistance for the body when traveling empty and to prevent overstressing of these pairs of rubber bodies 42 at each end of the axle a stop is provided between each end plate 39 and the adjacent axle bracket 46 to limit upward movement of the corresponding end of the truss or I-beam 28 relative to the vehicle frame. For this purpose an L-shaped metal bracket 52 is secured to the outer face of each end plate 39 above the corresponding rubber body 42 and carries an upstanding rubber bumper 53. The top of each rubber bumper is arranged to contact an L-shaped bracket 54 secured to the corresponding face of the flange 45 of the adjacent frame bracket 46.

The lower end of each frame bracket 46 is shown as reinforced by a diagonal bar 55 connecting it with the main longitudinal side frame bar 18 of the vehicle. This bar is designed to prevent spreading of the lower ends of the frame brackets 46 and for this purpose the diagonal bars 55 extend upwardly toward each other from the lower ends of the frame brackets 46 so as to act in tension.

An additional rectilinear movement type of rubber spring, indicated generally at 58, is provided between each end of each truss or I-beam 28 and the adjacent main longitudinal side frame bar 18 for the purpose of limiting and resiliently cushioning lateral axle movement, that is, movement of the axle axially or laterally of the frame, and still permitting vertical movement of the axle with reference to the frame. These springs also control sidesway. To this end the rubber springs 58 each comprises a relatively small rectangular rubber body 59 vulcanized between a pair of metal plates 60 and 61. One plate 60 is secured, as by bolts 62, to the vertical web 36 of the upstanding bracket 34 at each end of the truss or I-beam 28. The other plate 61 is secured, as by bolts 63, to the adjacent vertical face of the main longitudinal side frame bar 18. It will be seen that the rubber bodies 59 yieldingly resist movement of the axle 20 laterally of the frame but act, however, as cushions in compression in this action. It will also be seen that these rubber bodies add to the resilient resistance provided by the larger shear rubber bodies 42 and also act to control sidesway.

The principal feature of the present invention resides in the provision of an air spring or bellows, indicated generally at 65, between the top of each truss or I-beam 28 and a frame bracket, indicated generally at 66, fast to the corresponding main longitudinal side frame bar 18. For this purpose the frame bracket 66 is in the form of a generally rectangular vertical attaching plate 68 secured, as by rivets 69, to the outer face of each main longitudinal side frame bar 18 in centered relation above the axle housing 20. This attaching plate 68 is provided with an outwardly projecting horizontal flange 70 extending substantially the full length of the attaching plate 68 and reinforced by a plurality of triangular webs 71 rising from its upper face.

Each rubber spring 65 is shown as being in the form of a long narrow horizontally elongated rubber bellows formed to provide a pair of horizontal encircling corrugations. Each bellows is shown as arranged between an upper dished metal plate 74 and a lower dished metal plate 75 and as having an air pipe or line 76 extending through its upper plate 74 and through the horizontal flange 70 of the frame bracket 66. The air spring or bellows 65 is shown as arranged directly above the top plate 32 at the center of the corresponding I-beam or truss 28 but the sides and bottom plate 75 of this bellows are shown as enveloped by a strap 79 which has its center part arranged under the bottom plate 75 of the bellows and extends lengthwise of the main longitudinal side frame beams 18. The ends of this strap 79 extend upwardly and are secured, as by bolts 80, to the front and rear ends, respectively, of the horizontal flange 70 of the corresponding frame bracket 66. The purpose of the strap 79 is to limit the rebound action of the air bellows or spring 65 and it will be seen from FIG. 7 that under extreme rebound movements of the axle housing 20, the rebound action of the air bellows or spring 65 is positively limited by this strap so that overstressing of the rubber bodies 47, 58 under rebound force generated by the air springs 65 is prevented.

The purpose of the air spring 65 is both to provide the main resilient support for the vehicle body when loaded and also to permit of maintaining the body at a constant height with reference to the ground and axles. For this purpose air under pressure is introduced and exhausted through each line 76 in response to loading of the truck body, a control system suitable for this purpose being illustrated in FIG. 8.

As shown in this figure the numeral 85 repersents a high pressure air tank having a supply line 86. The outlet is shown as having two branches 87 each connecting with a three way valve 88 having an exhaust port 89. The stem 90 of each valve 88 is shown as connected to a bracket 91 welded to the corresponding end of the rear axle housing 20. When the body of the truck is lightly laden the outlet line 92 of each three way valve 88 is connected to its exhaust 89. When the truck is loaded to a predetermined weight the axle housing 20 moves toward each valve 88 and connects each pressure line 88 with the line 92. This pressure of each line 92 is applied to a time delay relay 93 which, if the line 92 remains pressurized for a long enough period of time, delivers pressure through a line 94 to a corresponding air relay 95 having an exhaust 96. Each air relay can be in the form of an enclosed bellows 98 actuating a three way valve 99. When actuated by the relay 93, high pressure air is delivered from the branch 100 through a line 101 to the line 76 connecting with the corresponding air bellows 65. This increased pressure in each air spring or bellows 65 raises the vehicle body to the extent required to cause the axle housing 20 to shift the three way valve 88 and cut out the further flow of high pressure air from the tank 85 to the bellows.

A rubber bottoming bumper 105 for the suspension as a whole is shown as mounted on a bracket 106 suitably secured to the center of each truss or I-beam 28 to be below and hence in the path of the corresponding main longitudinal side frame beams 18 and thereby compress under extreme shock load conditions as illustrated in FIG. 5.

In the operation of the suspension at the rear end of the vehicle, when the vehicle is empty, the parts are in the position shown in FIGS. 1–4. As shown in these figures, in this condition a downward force is transmitted from the frame brackets 46 through the rubber bodies 42 of the rubber springs 47 to the corresponding end of each axle truss or I-beam 28 and through the axle bracket 24, axle housing 20, and wheels 21 to the ground. Since the rubber bodies 42 are of relatively small cross section, that is, in a plane parallel to the plates 40 and 43 to which these rubber bodies are bonded, these rubber bodies provide a desired low spring frequency when the vehicle is travelling empty.

When the vehicle is travelling empty the shear rubber springs 58 also contribute to the vertical resiliency in providing a desired low frequency spring rate. Thus these shear rubber springs 58 are positioned directly between each upstanding end bracket 34 for each truss and the adjacent main longitudinal side frame beam 18 and hence are flexed in rectilinear shear in the same manner as the rubber bodies 42 in supporting the empty body.

When the vehicle is loaded these rubber springs 47 and 58 flex until the rubber bumpers 53 at opposite ends of each truss or I-beam 28 contact the angle bracket 54 on the corresponding frame bracket 46. These rubber bumpers 53 limit the degree of flexing of these rubber springs 47 and 58 and hence prevent them from being overstressed. At the same time it will be seen that the rubber springs 58 are fully effective in providing a laterally cushioned movement of the axle housing 20. Thus, regardless of the load imposed upon the body, movement of the axle housing 20 laterally of the body or lengthwise of its own axis is resisted by the rubber bodies 59 of the rubber springs 58 which are compressed in response to such forces. These rubber bodies 59 are selected to provide the required cushioning for such lateral axle movement, such cushioning being required only when the truck is laden and is not being required with an empty truck.

Further loading of the body is resisted by the air springs or bellows 65, the pressure in which is controlled to maintain the body at a constant height. Thus when the truck is loaded to a degree where the body moves below this predetermined height, the axle housing 20 moves upward toward the three-way valves 88 mounted on the truck chassis 16 and actuates these valves to connect the pressure lines 87 from the high pressure tank 85 with the lines 92. This pressure is applied to the time delay relays 93 which, if the lines 92 remain pressurized for a long enough period of time, deliver pressure through the lines 94 to the bellows 98 of the air relays 95. The purpose of the time delay relays 93 is to prevent such energization of the air relays 95 in response to the normal up-and-down axle movements encountered in moving along the highway and to change the body height, or elevation from the ground, only in response to a sustained position of the body dropping below this predetermined height or elevation. When actuated by the relays 93 the three way valves 99 of the relays 95 deliver high pressure air from the tank 85 and branches 100 to the lines 101 connecting with the lines 76 of the several air bellows 65. Accordingly the pressure in these air springs or bellows is increased to elevate the body back to the desired elevation from the ground at which time the three-way valves 88 are actuated to cut off the flow of further air pressure to these air springs or bellows 65. Separate control of the air springs prevents interchange of air pressure between them in rounding curves.

When the body is unladen, a similar constant height or elevation from the ground is maintained by the three-way valves 88, these valves and the relays 95 being actuated to relieve air from the air springs or bellows 65 for this purpose, this air escaping through the vents 89 and 96 of the three-way valves 88 and 99.

Under maximum shock conditions the suspension will bottom and for this purpose the bottoming bumper 105 comes into contact with the underside of the main longitudinal side frame beam 18 as illustrated in FIG. 5.

Under extreme rebound conditions the rebound force of each bellows or air spring 65 is prevented from reacting deleteriously against the relative small rubber bodies of the shear rubber springs 47 and 58. For this purpose the strap 79 extends under and around the ends of each bellows or air spring 65 and has its ends fastened to the frame bracket 66 against which the air bellows works. Accordingly under extreme rebound conditions this strap leaves contact with the top plate 32 of the truss or I-beam 28 and forms the essential support and contains the air spring or bellows to limit its expansion. Accordingly, as illustrated in FIG. 6 the air spring or bellows 65 can react under rebound forces only to the extent permitted by the strap 79 and cannot impose excessive rebound forces against the rubber springs 47, 58.

Since the rubber bodies 42 are interposed between the plates or flanges 39, 40, 43 and 45 which, at opposite ends of the I-beam or truss 28, converge upwardly toward one another, it will be seen that the downward movement of the frame brackets 46 effects a wedging action on these rubber blocks or bodies. This wedging action increases as the load increases up to the point of maximum loading of these rubber bodies as determined by the rubber bumpers 53. Accordingly this wedging action greatly increases the carrying capacity of the rubber bodies 42. This wedging action also eliminates the need for an adjusting mechanism for the initial stress imposed upon the rubber bodies and simplifies the mounting problems by the elimination of such adjustment. It also improves the resistance curve of the suspension for the empty body since the resistance is more nearly constant at the start of deflection and increases through compression of the rubber bodies as the deflection increases.

It will accordingly be seen that the present invention achieves the various objectives set forth in a simple and effective manner and in particular provides automatic body height control while at the same time providing wide effective spring centers for effective sidesway or body roll control.

What is claimed is:

1. A vehicle spring suspension adapted to be interposed between the frame of a highway vehicle and an axle having a wheel journalled thereon, comprising a truss fast to each end of said axle and extending transversely of said axle and having upright faces at its opposite ends facing fore-and-aft with reference to the direction of movement of the vehicle, a frame bracket fast to said frame at each end of said truss and having an upright face opposing the corresponding face of said truss, a rubber body secured at its opposite vertical sides to each companion pair of upright faces of said trusses and frame brackets and distorted in generally vertical shear in supporting said frame on said trusses and permitting limited axial movement of said axle with reference to said frame, an additional upright face at each end of each truss facing transversely of the said direction of movement of the vehicle and opposing said frame, a rubber body secured at opposite vertical sides to each of said last mentioned faces and to said frame and distorted in generally vertical shear and limiting said axial movement of said axle, means interposed between each truss and frame for raising and lowering said frame in small increments with reference to said trusses, and means responsive to changes in elevation of said frame with reference to said axle and actuating said last mentioned means to maintain said frame at a substantially constant height from the ground.

2. A vehicle spring suspension adapted to be interposed between the frame of a highway vehicle and an axle having a wheel journalled thereon, comprising a truss fast to each end of said axle and extending transversely of said axle and having upright faces at its opposite ends, a frame bracket fast to said frame at each end of each truss and having an upright face opposing the corresponding face of said truss, a rubber body secured at its opposite vertical sides to each corresponding pair of upright faces of said trusses and frame brackets and distorted in generally vertical shear in supporting said frame on said trusses, an air bellows operatively interposed between each truss and frame to support said frame on said trusses, and means responsive to changes in elevation of said frame with reference to said axle for increasing and decreasing the internal pressure of said bellows to maintain said frame at a substantially constant height from the ground.

3. A vehicle spring suspension as set forth in claim 2 additionally including means limiting the outward expansion of said bellows to limit the force of said bellows against said rubber bodies under rebound movements of the suspension.

4. A vehicle spring suspension as set forth in claim 2 additionally including a bottoming bumper cushion arranged directly above each end of said axle and operatively interposed between the center of each truss and said frame.

5. A vehicle suspension as set forth in claim 2 additionally including a stop fixed to each end of each truss, and companion stops fixed to said frame, each pair of companion stops interengaging on downward movement of said frame with reference to the corresponding truss end to prevent overstressing of the adjacent rubber body.

6. A vehicle spring suspension adapted to be interposed between the frame of a highway vehicle and an axle having a wheel journalled thereon, comprising a truss fast to each end of said axle and extending transversely of said axle and having upright faces at its opposite ends, a frame bracket fast to said frame at each end of each truss and having an upright face opposing the corresponding face of said truss, a rubber body secured at its opposite vertical sides to each corresponding pair of upright faces of said trusses and frame brackets and distorted in generally vertical shear in supporting said frame on said trusses, a second frame bracket fixed to said frame above each end of said axle and having a downwardly facing surface opposing the corresponding truss, an air bellows interposed between said truss and said opposing surface of said second frame bracket, and means responsive to changes in elevation of said frame with reference to said axle for increasing and decreasing the internal pressure of said bellows to maintain said frame at a substantially constant height from the ground.

7. A vehicle spring suspension as set forth in claim 6 additionally including a strap secured at its ends to said second frame bracket and embracing said bellows to limit its downward expansion thereby to limit the force of said bellows against said rubber bodies under rebound movements of the suspension.

References Cited in the file of this patent

UNITED STATES PATENTS

| 1,641,640 | Myers | Sept. 6, 1927 |
| 2,361,575 | Thompson | Oct. 31, 1944 |
| 2,704,664 | Hickman | Mar. 22, 1955 |
| 2,896,964 | Cornwall | July 28, 1959 |